United States Patent
Gabbay

(10) Patent No.: US 6,482,424 B1
(45) Date of Patent: Nov. 19, 2002

(54) METHODS AND FABRICS FOR COMBATING NOSOCOMIAL INFECTIONS

(75) Inventor: Jeffrey Gabbay, Jerusalem (IL)

(73) Assignee: The Cupron Corporation, New York, NY (US)

( * ) Notice: Subject to any disclaimer, the term of this patent is extended or adjusted under 35 U.S.C. 154(b) by 0 days.

(21) Appl. No.: 09/557,669

(22) Filed: Apr. 25, 2000

Related U.S. Application Data

(63) Continuation-in-part of application No. 09/327,400, filed on Jun. 7, 1999, now Pat. No. 6,124,221, which is a continuation-in-part of application No. 09/201,939, filed on Dec. 1, 1998, now Pat. No. 5,939,340, which is a continuation-in-part of application No. 08/693,657, filed on Aug. 9, 1996, now Pat. No. 5,981,066, and a continuation-in-part of application No. 08/693,656, filed on Aug. 9, 1996, now Pat. No. 5,871,816.

(51) Int. Cl.[7] ............................................. A01N 25/34
(52) U.S. Cl. ........................ 424/404; 424/402; 424/400
(58) Field of Search ................................. 424/404, 402, 424/400

(56) References Cited

U.S. PATENT DOCUMENTS 5,458,906 A * 10/1995 Liang ..................... 427/2.31

FOREIGN PATENT DOCUMENTS

| FR | 1499358 | * 12/1996 |
| JP | 6-285772 | * 7/1996 |

* cited by examiner

*Primary Examiner*—Thurman K. Page
*Assistant Examiner*—Rachel M. Bennett
(74) *Attorney, Agent, or Firm*—Townsend and Townsend and Crew LLP

(57) ABSTRACT

The invention provides a method for combating and preventing nosocomial infections, comprising providing to health care facilities textile fabrics incorporating fibers coated with an oxidant, cationic form of copper, for use in patient contact and care, wherein the textile fabric is effective for the inactivation of antibiotic resistant strains of bacteria.

11 Claims, No Drawings

METHODS AND FABRICS FOR COMBATING NOSOCOMIAL INFECTIONS

The present specification is a continuation-in-part of U.S. Ser. No. 09/327,400, filed Jun. 7, 1999, now issued as U.S. Pat. No. 6,124,221, which in turn is a continuation-in-part of U.S. Ser. No. 09/201,939, filed Dec. 1, 1998, now issued as U.S. Pat. No. 5,939,340, which in turn is a continuation-in-part of U.S. Ser. No. 08/693,656 filed Aug. 9, 1996, now issued as U.S. Pat. No. 5,871,816, and a continuation-in-part of U.S. Ser. No. 08/693,657 filed Aug. 9, 1996, now issued as U.S. Pat. No. 5,981,066.

The present invention relates to a method and products for combating and preventing nosocomial infections. More particularly, the present invention relates to textile fabrics for use in healthcare facilities and effective for the inactivation of antibiotic resistant strains of bacteria.

In both WO 09/06508 and in WO 98/06509, which correspond, respectively, to said latter U.S. applications, and the teachings of which are incorporated herein by references, the state of the prior art is described as follows:

Beds commonly are infested by tiny mites. These mites eat bacteria and fungi that grow on epidermal scales shed by people who sleep in the beds. Fragments of dead mites and mite excreta, are allergens, to which asthmatics and people with dust allergens are sensitive. It has been found that some metals and metal oxides, notably Cu, CuO, Ag and $Ag_2O$, repel mites.

The conventional method for making textiles inhospitable to mites is to treat the textiles with an organic acaricide such as benzyl benzoate. For example, Bischoff et al., in U.S. Pat. No. 4,666,940, 4teach an acaricide that includes benzyl benzoate and a solid powder carrier Whose particles are of a size suitable for ingestion by the mites. These acaricides must be replaced every time the textile is laundered. Thus, Bischoff et al. recommend using their acaricide on textiles, such as carpets and upholstery, that are not laundered frequently. An inherently acaricidal bedsheet would keep a bed free of mites, even after multiple launderings, without the need to reapply acaricide to the bedsheet.

The methods known in the prior art for bonding a metal or a metal oxide to a textile generally require that the metal or its oxide be bonded indirectly to the textile. For example, the metal may be reduced to a powder and suspended in a binder. The binder-metal mixture then is applied to the textile, with the binder, and not the metal, bonding to the textile. Alternatively, the metal is reduced to a powder, an adhesive is applied to the textile, and the metal powder is spread on the adhesive. Examples of both such methods may be found in U.S. Pat. No. 1,210,375, assigned to Decker. These methods are less than satisfactory for the above applications, for at least two reasons. First, the carrier or adhesive may entirely encapsulate the metal or metal oxide powder particles, inhibiting their contact with mites, fungi and bacteria, and making the textile useless as an acaricide, fungicide, or bactericide. Second, multiple launderings tends to weaken the binder or adhesive and loosen or remove the particles.

Two notable exceptions to the general rule that metals and metal oxides have not heretofore been bonded directly to textiles are nylon textiles and polyester textiles, which may be plated with metals using standard electrolyses plating processes for plating plastics. The specific electrolyses plating methods known to the art are restricted in their applicability to only certain plastics, however. In particular, they are not suited to natural fibers, nor to most synthetic fibers.

With this state of the art in mind, both of said publications taught various aspects of a textile with a full or partial metal or metal oxide plating directly and securely bonded to the fibers thereof.

More specifically, in WO 98/06509 there is provided a process comprising the steps of: (a) providing a metallized textile, the metallized textile comprising: (i) a textile including fibers selected from the group consisting of natural fibers, synthetic cellulosic fibers, regenerated fibers, acrylic fibers, polyolefin fibers, polyurethane fibers, vinyl fibers, and blends thereof, and (ii) a plating including materials selected from the group consisting of metals and metal oxides, the metallized textile characterized in that the plating is bonded directly to the fibers; and (b) incorporating the metallized textile in an article of manufacture.

In the context of said invention the term "textile" includes fibers, whether natural (for example, cotton, silk, wool, and linen) or synthetic yarns spun from those fibers, and woven, knit, and non-woven fabrics made of those yarns. The scope of said invention includes all natural fibers; and all synthetic fibers used in textile applications, including but not limited to synthetic cellulosic fibers (i.e., regenerated cellulose fibers such as rayon, and cellulose derivative fibers such as acetate fibers), regenerated protein fibers, acrylic fibers, polyolefin fibers, polyurethane fibers, and vinyl fibers, but excluding nylon and polyester fibers, and blends thereof.

Said invention comprised application to the products of an adaptation of technology used in the electrolyses plating of plastics, particularly printed circuit boards made of plastic, with metals. See, for example, Encyclopedia of Polymer Science and Engineering (Jacqueline I. Kroschwitz, editor), Wiley and Sons, 1987, vol. IX, pp 580–598. As applied to textiles, this process included two steps. The first step was the activation of the textile by precipitating catalytic noble metal nucleation sites on the textile. This was done by first soaking the textile in a solution of a low-oxidation-state reductant cation, and then soaking the textile in a solution of noble metal cations, preferably a solution of Pd++ cations, most preferably an acidic $PdCl_2$ solution. The low-oxidation-state cation reduces the noble metal cations to the noble metals themselves, while being oxidized to a higher oxidation state. Preferably, the reductant cation is one that is soluble in both the initial low oxidation state and the final high oxidation state, for example Sn++, which is oxidized to Sn++++, or Ti+++, which is oxidized to Ti++++.

The second step was the reduction, in close proximity to the activated textile, of a metal cation whose reduction was catalyzed by a noble metal. The reducing agents used to reduce the cations typically were molecular species, for example, formaldehyde in the case of Cu++. Because the reducing agents were oxidized, the metal cations are termed "oxidant cations" herein. The metallized textiles thus produced were characterized in that their metal plating was bonded directly to the textile fibers.

In preferred embodiments, said article of manufacture referred to therein.

In WO 98/06508 there is described and claimed a composition of matter comprising:

(a) a textile including fibers selected from the group consisting of natural fibers, synthetic cellulosic fibers, regenerated protein fibers, acrylic fibers, polyolefin fibers, polyurethane fibers, vinyl fibers, and blends thereof; and (b) a plating including materials selected from the group consisting of metals and metal oxides; the composition of matter characterized in that said plating is bonded directly to said fibers.

Said publication also claims a composition of matter comprising:

(a) a textile including fibers selected from the group consisting of natural fibers, synthetic cellulosic fibers, regenerated protein fibers, acrylic fibers, polyolefin fibers, polyurethane fibers, vinyl fibers, and blends thereof; and (b) a plurality of nucleation sites, each of said nucleation sites including at least one noble metal; the composition of matter characterized by catalyzing the reduction of at least one metallic cationic species to a reduced metal, thereby plating said fibers with said reduced metal.

In addition, said publication teaches and claims processes for producing said products.

A preferred process for preparing a metallized textile according to said publication comprises the steps of:

a) selecting a textile, in a form selected from the group consisting of yarn and fabric, said textile including fibers selected from the group consisting of natural fibers, synthetic cellulosic fibers, regenerated protein fibers, acrylic fibers, polyolefin fibers, polyurethane fibers, vinyl fibers, and blends thereof;

b) soaking said textile in a solution containing at least one reductant cationic species having at least two positive oxidation states, said at least one cationic species being in a lower of said at least two positive oxidation states;

c) soaking said textile in a solution containing at least one noble metal cationic species, thereby producing an activated textile; and d) reducing at least one oxidant cationic species in a medium in contact with said activated textile, thereby producing a metallized textile.

While the metallized fabrics produced according to said publications are effective acaricides, it was found that they are also effective in preventing an/or treating bacterial, fungal and yeast infections which afflict various parts of the human body and that therefore the incorporation of at least a panel of a metallized textile material in an article of clothing can have extremely beneficial effect.

Thus, in U.S. Ser. No. 09/327,400 there is described and claimed an article of clothing having antibacterial, antifungal, and antiyeast properties, comprising at least a panel of a metallized textile, the textile including fibers selected from the group consisting of natural fibers, synthetic cellulosic fibers, regenerated protein fibers, acrylic fibers, polyolefin fibers, polyurethane fibers, vinyl fibers, and blends thereof, and having a plating including an antibacterial, antifungal and antiyeast effective amount of at least one oxidant cationic species of copper.

In said specification there was described that said article of clothing was effective against Tinea Pedis, against Candida Albicans, against Thrush and against bacteria causing foot odor, selected from the group consisting of *brevubacterium, acinetobacter, micrococcus* and combinations thereof.

Thus, said invention was especially designed for preparation of articles such as underwear and articles of hosiery.

It has now, however, been surprisingly discovered that textile fabrics incorporating fibers coated with an oxidant cationic form of copper are also effective for the inactivation of antibiotic resistant strains of bacteria.

As is know, the world medical profession is engaged in a battle with viruses and mutating microbes which find a natural habitat in humans as well as hospitals, wards, and in areas where populations of generally weak or sick individuals congregate. These microbes can be deadly and have demonstrated their ability to survive by developing resistance to existing antibiotics. In the field of bacteria, among the most worrying are Methicillin Resistant Staphylococcus Aureus (MRSA) and other strains such as Vancomycin Resistant Enterococcus (VRE). According to the Center for Disease Control, infections caught in hospitals kill more people every year in the U.S.A. than the total number of people murdered and killed in road traffic accidents combined. From the approximate 10 million hospital entries registered in the U.S.A. last year, more than 2 million cases of nosocomial infections were recorded, resulting in about 90,000 deaths. This number represents a 36% overall increase in the statistics of 1998 compared to 1999.

Because hospitals represent a large collection of people in a weakened state, the diseases generated by these bacteria can be easily spread from one patient to another, helped by the proximity of patients and unwittingly by healthcare workers who tend to multiple patients. As the microbes are exposed to more antibiotics their ability to build up resistance also increases. Simply, the greater the exposure to antibiotics the bacteria experience, the greater the driving force for them to develop resistance. Combine this with the ability of the bacteria to settle into wounds created by routine surgery and one can face a very serious threat to life.

A unique approach to assisting in the alleviation of this problem would be to treat the environment, not just the patient. Since microorganisms are constantly expressed from the body through all holes and in perspiration, as well as the body liquids that settle on the fabrics used in the hospital, especially those fabrics used for the sheets and patient pajamas, an approach to arresting their effect would be to turn the fabric into an active antimicrobial/anti-virus active device. By treating the fabrics used in the hospital or ward with an effective germicide, one should be able to limit the spread of live bacteria throughout the location, thus limiting the spread of disease.

Thus, according to the present invention there is now provided a method for combating and preventing nosocomial infections, comprising providing to health care facilities textile fabrics incorporating fibers coated with an oxidant, cationic form of copper, for use in patient contact and care, wherein said textile fabric, is effective for the inactivation of antibiotic resistant strains of bacteria.

In preferred embodiments of the present invention said textile fabrics are formed into articles of bedding, articles of wear for patients, and articles of wear for health care personnel.

In especially preferred embodiments of the present invention said articles of bedding include sheets, pillow cases and blanket covers, said articles of wear for patients include pajamas and nightgowns and said articles of wear for healthcare personnel include uniforms. The invention also includes other textile products found in hospitals and similar facilities such as divider curtains.

In another aspect of the invention there is also provided textile fabrics for combating and preventing nosocomial infections in healthcare facilities, said fabrics incorporating fibers coated with an oxidant, cationic form of copper, for use in patient contact and care, wherein said textile fabric is effective for the inactivation of antibiotic resistant strains of bacteria.

The fabric can be made of almost any fiber, however, a certain percentage of the fibers in the yarn from which the fabric is made, is treated so that the fibers are coated with an ionic form of copper, e.g., CuO or $Cu_2O$. The copper is deposited through an oxidation reduction process on the fibers. The treated fibers are then mixed with regular untreated fibers and spun into yarns for introduction into a textile fabric.

Oxidation reduction of ionic copper onto cotton, Lyocell (recycled cellulose), as well as most commonly used textile polymers was found to create a bond between the copper and the surface of the fibers which is able to withstand at least twenty home launderings.

The surprising efficacy of ionic copper against anti-biotic resistant strains of bacteria is demonstrated by the test results set forth in Examples 3 and 4 hereinafter. The tests conducted demonstrate that surprisingly the fabric of the present invention is effective against a wild nosocomial strain of Staph A which has thus far killed 100% of the people who contracted it, as well as being effective against Vancomycin Resistant Enterococci (VRE) (Wild nosocomial strain). The tests were conducted in a P3 level laboratory due to the virulency of the strains. In Examples 3 and 4 there is documented what happened to nosocomial anti-biotic resistant strains of bacteria when placed on the fabric and then removed. The strains demonstrated a clear inability to multiply after touching the fabric in accordance with the test method which demonstrates that these highly toxic bacteria are rendered ineffective once they touch the treated fabric.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

Comparative Example 1

A metallized fabric was prepared as described in Example 1 of WO98/06508.

A dilute acidic solution of $SnCl_2$ was prepared by dissolving $SnCl_2$ and concentrated HCl in water.

A dilute acidic solution of $PdCl_2$ was prepared by dissolving $PdCl_2$ 10 and concentrated HCl and water.

A cotton fabric 250×250 cm was activated as follows:

Soak in a bath of the $SnCl_2$ solution

Soak in a bath of the $PdCl_2$ solution.

A dilute basic $CUSO_4$ solution was prepared by dissolving $CUSO_4$ and NaOH (in approximately equal weight proportions), a chelating agent, and polyethylene glycol in water.

The activated cotton fabric and formaldehyde were added to the $CUSO_4$ solution under a pure oxygen atmosphere. After between 2 minutes and 10 minutes, the cotton fabric was removed.

The palladium deposited on the cotton fabric in the activation step catalyzed the reduction of the Cu++ by the formaldehyde, providing a layer of copper tightly and intimately bonded to the fibers of the cotton fabric. The fabric, which initially was white in color, now as the color of copper metal, while retaining the flexibility and physical characteristics of the original fabric. The metallic copper color remained unchanged after several launderings.

The configuration of the bath is such that in the Copper Sulfate step the fabric is set up vertically and not in the tradition horizontal pile to allow a clean reduction on to the fabric surface of the desired copper. The vertical positioning of the fabric is done with the aid of or plurality of poles set up on a frame in an array similar to two spaced-apart rung ladders with the poles acting as said rungs. The fabric is interwoven in a repeating switchback array on the poles of the frame in such a way that at no place does the fabric touch other parts of the fabric. This configuration also allows the escape of gases as the chemicals react with one another thereby yielding a clean copper reduction on the fabric.

Example 2

The procedure of Example 1 was repeated using cotton yarn in place of cotton fabric. Yarn for weaving into a woven cloth was prepared from fibers which received 100% coating, which treated fibers were then combined in a ratio of 20 w/w % with 80% untreated fibers to form a yarn containing 20% copper. These yarns were then introduced as the weft (fill) yarn with warp threads, which were untreated, to produce panels of fabric containing 10% Cu++. This fabric was then tested for anti-microbial activity, the results of which are reported in Examples 3 and 4 hereinafter.

Example 3

Anti-microbial Activity of Treated Textile Against Nosocomial Strain of Staph A

Method: AATCC Technical Manual. Test Method 100-1993

Sample Product:

1. Washed 10%/$Cu^{++}$ Treated Woven cloth
2. Washed untreated Woven white cloth (control).

Date of Checking: Feb. 22, 2000
Date of Reading: Feb. 24, 2000
Materials and Culture Media:

| Neutralizing Solution: | Polysorbate 80 | 30 ml/lit. |
|---|---|---|
| | Lecithin | 3 gr/lit. |
| | Sodium thiosulphate | 5 gr/lit. |
| | R.O. Water | 1,000 ml. |

BP 220 Tryptic Soy Agar+Tween+Lecithin Lot No. 6717 (for microbial monitoring by plate count method).

Test Microorganism:

Methicillin Resistant *Stephylococcus aureus* MRSA) (Wild nosocomial strain)

ASSAY RESULTS

Inoculum Control on TSA+Tween 80+Lecithin.: $5.6 \times 10^4$ c.f.u./ml.

| Samples | Time 0 | c.f.u./sample 1 Hour Incubation (RT) | Reduction Percentage |
|---|---|---|---|
| Washed 10%/Cu$^{++}$Treated Woven cloth | $3 \times 10^4$ | <100 | 99% |
| Washed Untreated Woven White Cloth | $5.6 \times 10^4$ | $4.6 \times 10^4$ | 18% |

Example 4

Anti-microbial Activity of Treated Textile Against Nosocomial Strain of Vancomycin Resistant Enterococci (VRE) (Wild Nosocomial Strain)

Method: MTCC Technical Manual. Test Method 100-1993

Sample Product:
1. Washed 10%/Cu$^{++}$ Treated Woven cloth
2. Washed untreated Woven white cloth (control).
Date of Checking: Apr. 16, 2000
Date of Reading: Apr. 16, 2000
Materials and Culture Media:

| Neutralizing Solution: | Polysorbate 80 | 30 ml/lit. |
|---|---|---|
| | Lecithin | 3 gr/lit. |
| | Sodium thiosulphate | 5 gr/lit. |
| | R.O. Water | 1,000 ml. |

BP 220 Tryptic Soy Agar+Tween+Lecithin Lot No. 6717 (for microbial monitoring by plate count method).

Test Microorganism:
Vancomycin Resistant Enterococci (VRE) (Wild nosocomial strain)

ASSAY CONDITIONS

Test Temperature: 35° C.
Testing Time: 0 and 1 Hour
Microbial Monitoring Procedure: Pour Plate Method
Temperature and Time of Incubation: 37° C./48 Hours

ASSAY RESULTS

Inoculum Control on TSA+Tween 80+Lecithin: $2.88 \times 10^4$ c.f.u./ml

| Samples | c.f.u./sample Time of Exposure 35° C. 0 | 1 hour | Reduction Percentage |
|---|---|---|---|
| Washed 10%/Cu$^{++}$Treated Woven cloth | $2.76 \times 10^4$ | $1.5 \times 10^2$ | 99.5% |
| Washed Untreated Woven White Cloth | $2.88 \times 10^4$ | $2.2 \times 10^4$ | 23.6% | c.f.u. = Colony Forming Unit

From the above Examples 3 and 4, it is seen that indeed the products of the present invention are effective for combating and preventing nosocomial infections.

Having demonstrated the surprising effectiveness of the products of the present invention against nosocomial infections, further experiments were carried out on the safer strain of Staphylococcus Aureus—ATCC 6538 in order to determine the amount of fibers coated with an oxidant cationic form of copper necessary to obtain significant results.

More specifically, woven white cloth of a cotton polyester blend, having a weight of 150 g/m$^2$ was prepared, wherein the warp yarns were untreated, while the weft (or fill) yarns were treated yarns according to the present invention and instead of replacing all of the weft yarns with treated yarns having a 20% content of Cu$^{++}$, as was the case of the cloth tested in Examples 3 and 4, either every other yarn, every fourth yarn, or every sixth weft yarn was replaced by a 20:80 mixed treated yarn according to the present invention. Cloths prepared in this manner were then designated, respectively, as X2, X4 and X6 CU$^{+2}$ and submitted for testing.

Example 5

The experimental conditions were as follows:

| Period of analysis | 11.4.2000–15.4.2000 |
|---|---|
| Test temperature | Room |
| Neutralizing medium | Lecithin 3 g/l |
| | Polysorbate 80 3.0% V/V |
| | Sodium thiosulphate 5 g/l |
| | L-histidine 1 g/l |
| | in diluent sterilized for 20 mins at 121 ± 1° C. |
| Counting procedure | Pour Plate Count |
| Test Media | Tryptic Soy Agar, Difco |
| Temperature of incubation | 37 ± 1° C. |
| Incubation Period | 48 hours |

Method:
According to Antimicrobial Finishes on Textile Materials: Assessment of, AATCC Test Method 100-1993.

Test Microorganism:
Staphylococcus Aureus—ATCC 6538

Test results:

| Test Microorganism/ sample | Staphylococcus Aureus-ATCC 6538 (CFU per sample) | | | |
|---|---|---|---|---|
| Incubation time at 37° C. | Control untreated sample | X6 treated sample | X4 treated sample | X2 treated sample |
| Time 0 | $2.0 \times 10^5$ | $2.4 \times 10^5$ | $2.5 \times 10^5$ | $1.6 \times 10^5$ |
| 2 hour | $1.3 \times 10^5$ | $1.4 \times 10^4$ | $6.5 \times 10^3$ | $2.2 \times 10^3$ |

*There is about 2-log reduction for Staphylococcus Aureus after 2 hours of incubation at 37° C. for the X2 treated cloth.

It is to be noted from the above figures that X6 has a kill rate of about 94.17%, X4 has a kill rate of about 99.97% and X2 has a kill rate of about 99.98%.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A method for combating nosocomial infections, comprising providing to health care facilities textile fabrics incorporating fibers coated with a $Cu^{++}$ cationic form of copper, for use in patient contact and care, wherein said textile fabric is effective for the inactivation of Methicillin Resistant *Staphylococcus aureus* and Vancomycin Resistant Enterococci.

2. A method according to claim 1, wherein said textile fabrics are formed into articles of bedding, articles of wear for patients, and articles of wear for health care personnel.

3. A method according to claim 1, wherein said articles of bedding include sheets, pillow cases and blanket covers.

4. A method according to claim 1, wherein said articles of wear for patients include pajamas and nightgowns.

5. A method according to claim 1, wherein said articles of wear for healthcare personnel include uniforms.

6. Textile fabrics for combating nosocomial infections in healthcare facilities, said fabric incorporating fibers coated with a $Cu^{++}$ cationic form of copper, for use in patient contact and care, wherein said textile fabric is effective for the inactivation of Methicillin Resistant *Staphylococcus aureus* and Vancomycin Resistant Enterococci.

7. A textile fabric according to claim 6 for combating nosocomial infections in healthcare facilities, said textile fabric including a percentage of fibers selected from to group consisting of natural fibers, synthetic cellulosic fibers, regenerated protein fibers, acrylic fibers, polyolefin fibers, polyurethane fibers, vinyl fibers, and blends thereof and having a coating of a $Cu^{++}$ cationic form of copper effective for the inactivation of Methicillin Resistant *Staphylococcus aureus* and Vancomycin Resistant Enterococci mixed with regular untreated fiber.

8. A textile fabric according to claim 6 for combating nosocomial infections in healthcare facilities, said textile fabric including a percentage of fibers selected from the group consisting of natural fiber, synthetic cellulosic fibers, regenerated protein fibers, acrylic fibers, polyolefin fibers, polyurethane fibers, vinyl fibers, and blends thereof, said fibers having a coating of at least one cationic species of copper produced by a first step of soaking said fibers in a solution of a low-oxidation state reductant cation, then in a solution of noble metal cations to produce activated nucleation sites on the fibers; followed by a third step of introduction of a reducing agent and a copper salt, in close proximity to the activated fibers, to produce copper cations which plate the fibers with a $Cu^{++}$ cationic species of copper to provide the sane with antibacterial properties effective for the inactivation of antibiotic resistant strains of bacteria, said treated fibers being mixed with regular untreated fibers to from said textile fabric.

9. A textile fabric according to claim 6 for combating nosocomial infections in healthcare facilities, wherein the cationic species of copper comprises $Cu^{2+}$ ions which are supplied from a copper sulfate solution.

10. A textile fabric according to claim 8 for combating nosocomial infections in healthcare facilities wherein the reducing agent is formaldehyde.

11. A method of combating nosocomial infections in a healthcare facility; comprising manufacturing a textile fabric from fibers coated with coated with a $Cu^{++}$ cationic form of copper, wherein said textile fabric is effective for the inactivation of Methicillin Resistant *Staphylococcus aureus* and Vancomycin Resistant Enterococci; and supplying the textile fabric to a healthcare facility for use in patient contact and care.

* * * * *